United States Patent [19]

Chadwick et al.

[11] 4,183,483

[45] Jan. 15, 1980

[54] TRANSLATING MECHANISM

[75] Inventors: Curt H. Chadwick, Los Altos; John E. Raffarin, Sunnyvale, both of Calif.

[73] Assignee: GTE Sylvania Incorporated, Stamford, Conn.

[21] Appl. No.: 883,575

[22] Filed: Mar. 6, 1978

[51] Int. Cl.² ............................................ F16M 13/00
[52] U.S. Cl. ...................................... 248/421; 74/521
[58] Field of Search .................... 74/521; 248/277, 421

[56] References Cited

U.S. PATENT DOCUMENTS

| 1,088,419 | 2/1914  | Heyer  | 248/421   |
| 2,618,682 | 11/1952 | Thumim | 74/521 X  |

FOREIGN PATENT DOCUMENTS 635523  4/1950  United Kingdom ..................... 248/421

Primary Examiner—C. J. Husar
Assistant Examiner—Conrad Berman
Attorney, Agent, or Firm—John F. Lawler

[57] ABSTRACT

A translating mechanism for accurately positioning and locking an object relative to a reference plane comprises a base plate which defines the reference plane and a platform supported parallel to the base plate for movement in a direction perpendicular to the plane of the base plate. A spring between the base plate and platform urges the latter away from the plate and an adjustment screw operably connected to the platform and to the plate permits changing of the spacing between the platform and plate against the bias of the spring. Nestable U-shaped arms pivotally connected to the plate and platform, respectively, and to each other directly slideably engage the plate and platform, and maintain parallelism therebetween during their relative movement. A flexible end wall adjacent to the platform releasably clamps the platform against the opposite end wall to lock same in any position within its range of movement. This also minimizes the load path length between platform and base.

11 Claims, 11 Drawing Figures

TRANSLATING MECHANISM

BACKGROUND OF THE INVENTION

This invention was made under a contract with the Department of the Air Force.

This invention relates to an improved single axis translation mechanism useful for accurately positioning objects such as optical elements in fieldable laser systems.

In general, crystals used in laser resonators require a support capable of providing translation of the crystal along an axis perpendicular to the laser beam. Translation parallel to the laser base plate may be obtained through use of conventional translation support secured to the base plate. Vertical axis translation, in the past, has been provided by a second stage or support bolted and on the top of the first stage and movable perpendicularly thereto. The crystal mount is then secured to the moveable part of the second stage. This arrangement has resulted in a large bulky package which is not easily lockable and which is sensitive to vibration due to the long load path from the laser base plate to the crystal mount. This invention is directed to an improved translation mechanism which solves these problems.

OBJECTS AND SUMMARY OF THE INVENTION

An object of this invention is the provision of a translation mechanism of the type described which is simple in design and compact.

Another object is the provision of such a mechanism that has a load path with minimum length and therefore is resistant to vibration.

Still another object is the provision of a mechanism having the foregoing advantages and which is fully lockable.

These and other objects of the invention are achieved with a mechanism having cooperating support arms pivoted together and to the platform and base plate, respectively, so as to make direct sliding contact with these parts. The ends of the arms which engage the base plate and platform, respectively, has radii of curvature equal to the spacing of the pivotal axes of the arms from their respective connections to the plate and platform. The arms are configured to be fully nestable within each other at one limit of translating movement, thus minimizing the space required for the mechanism. The platform is lockable in any position between end walls thus minimizing the load path of the object mounted of the platform.

DESCRIPTION OF PREFERRED EMBODIMENT

Figure 1:
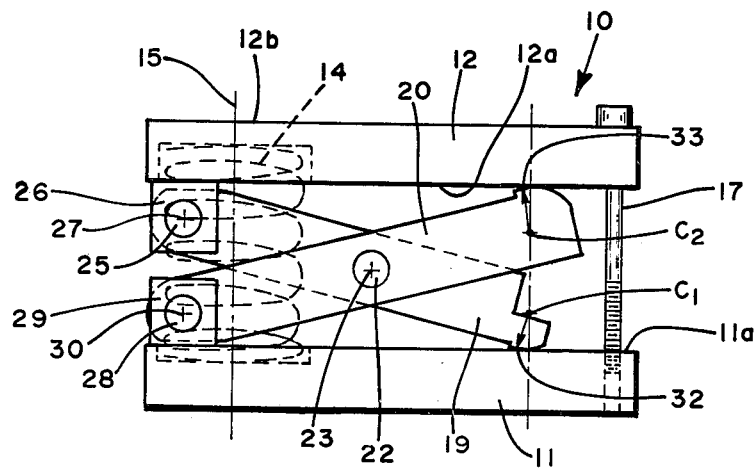
FIG. 1 is a simplified elevation of a mechanism embodying this invention showing the platform in the fully extended position relative to the base.
Figure 2:
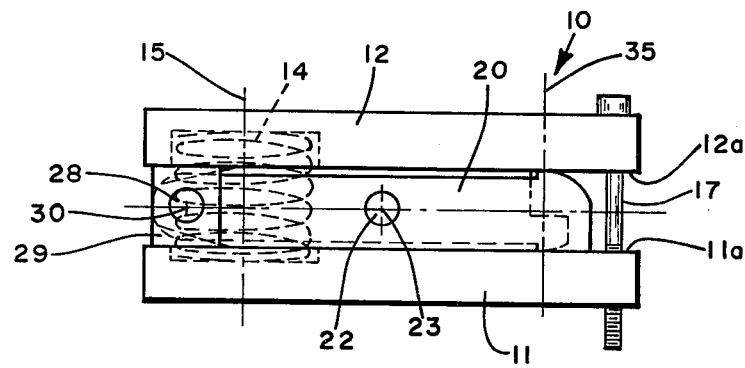
FIG. 2 is a view similar to FIG. 1 with the mechanism fully contracted.

Referring now to the drawings, FIG. 1 and 2 are simplified illustrations of translation mechanism 10 embodying the invention, the mechanism comprising a plane base plate 11, a platform 12 disposed parallel to the plane of plate 11, a helical spring 14 between plate 11 and platform 12 near one side thereof, a screw 17 extending through platform 12 at the opposite side and threadedly engaging plate 11, and support arms 19 and 20 which constrain the plate and platform to move toward and away from each other in parallelism. Arms 19 and 20 are pivotedly connected together by pin 22 at their midpoints defined below and along axis 23. Inner arm 19 is pivotedly connected by pin 25 to a boss 26 on platform 12 along axis 27 and outer arm 20 is similarly connected by pin 28 to boss 29 on plate 11 along axis 30. Bosses 26 and 29 are laterally offset from each other and located at the spring side with pivotal axes 23,27 and 30 parallel to each and to the plane of the base plate. The spacings of axes 27 and 30 from the platform and plate, respectively, are equal.

Figure 3:
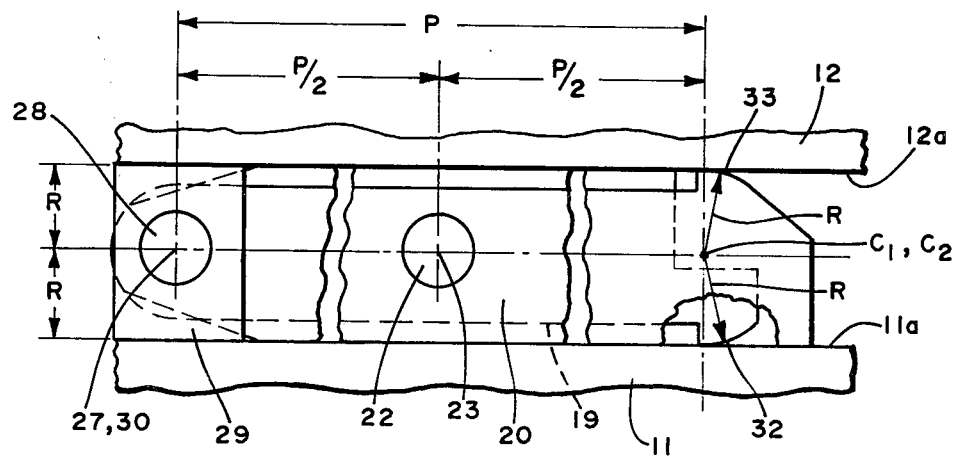
FIG. 3 is a greatly enlarged view of a portion of FIG. 2 showing details of construction of the support arms.

Arms 19 and 20 have cylindrically shaped contact surfaces 32 and 33, respectively, see FIG. 3, which make unconnected sliding engagement with the inner surfaces 11a and 12a of plate 11 and platform 12, respectively. The radii R of curvature of surfaces 32 and 33, see FIG. 3, are equal and the distances P between pivot axis 27 and 30 of the arms and the centers $C_1$ and $C_2$ of formation of each curved surface are equal. As mentioned above, axis 23 is on the midpoint of the line between axis 27 and center $C_1$ on arm 19, and it also is on the midpoint of the line between axis 30 and center $C_2$ on arm 20. Also mentioned above, the spacing of inner arm pivotal axis 27 from platform inner surface 12a is equal to the spacing of outer arm pivotal axis 30 from plate inner surface 11a; in addition, these spacings are equal to radius R. Such dimensional relationships of the inner and outer arms causes the points of engagement of contact surfaces 32 and 33 of the arms with plates surface 11a and platform surface 12a, respectively, to be vertically aligned (as viewed) at all times during movement of the platform relative to the base plate. This alignment is indicated by the vertical line 35 in FIGS. 1 and 2. In addition these dimensional relationships guarantee that if platform 12 is held in contact with surface 33 of arm 20 and if plate 11 is held in contact with surface 32 on arm 19, then platform 12 will be parallel to plate 11 independent of the extension of platform 12 relative to plate 11. Screw 17 and spring 14 act in conjunction with each other to hold the lower surface 12a of platform 12 in contact with surface 33 of arm 20 and to hold the upper surface 11a of plate 11 in contact with surface 32 of arm 19. Spring 14 acts on plate 11 and platform 12 to urge axes 27 and 30 apart to a certain distance. Due to the connection of arms 19 and 20 at axis 23, this action causes centers $C_1$ and $C_2$ to move apart the same distance. This continues until platform 12 is in contact with the underside of the head of screw 17, surface 33 is against the underside of platform 12, and surface 32 is against the upper surface 11a of plate 11.

Adjustment of the elevation of platform 12 above base plate 11 is accomplished with screw 17. Rotation of screw 17 in one direction draws the plate and platform toward each other against the bias of spring 14. During this movement, arms 19 and 20 pivot about their respective axes until at the limit of movement shown in FIG. 2, the arms are nested together in horizontal alignment, the plate and platform being spaced apart by a distance 2R. As the screw is rotated in the opposite direction, the spring urges the platform away from the plate and arms 19 and 20 pivot in opposite directions as their respective contact surfaces 32 and 33 rotate and slide over the adjacent surfaces of the platform and plate, respectively. Parallelism between the platform and plate is thus maintained at all times over the full range of adjustment spacing.

The invention may be practiced with two pairs of support arms symmetrically arranged about a center plane of the mechanism containing spring axis 15. A preferred embodiment of the invention, however, utilizes a single pair of arms and is illustrated as the translating mechanism 40 shown in FIGS. 4–11 inclusive, and described below.

Mechanism 40 comprises a base plate 41 having end walls 42 and 43 projecting upwardly from and normal to the plane of the base plate. End wall 42 preferably is integral with the body of the base plate while end wall 43 comprises an L-shaped member removably secured to the base plate by screws 46. Side walls 44 and 45 similarly are secured to the base plate by screws 47 and 48, respectively. End wall 43 is formed with vertical and lateral flexing slots 50 and 51, respectively, see FIG. 6, which permit wall 43 to be flexed inwardly against platform 53 to provide an integrated clamping action over the full range of movement of the platform as will be explained below.

Platform 53 is spaced closely to end walls 42 and 43 (about 0.001 inch clearance) and further from side walls 44 and 45 for movement relative to and perpendicular to the plane of the base plate 41. In order to selectively clamp and lock platform 53 at any elevation above base plate 41 within the range of movement, elongated screws 55 and 56 extend through end wall 42, bores 57 and 58, respectively, in platform 53, end wall 43 and into engagement with a tapped nut plate 59 on the exterior of end wall 43. In order to accommodate movement of the platform, end wall 43 has vertically elongated slots 61 and 62 to receive the shanks of screws 55 and 56 respectively, see FIG. 6, and end wall 42 similarly has vertically elongated slots 63 and 64, see FIG. 9, for this purpose. When screws 55 and 56 are tightened, end wall 43 is flexed tightly against the adjacent side of the platform to clamp the platform securely between both end walls in the selected elevation position.

Figure 4:
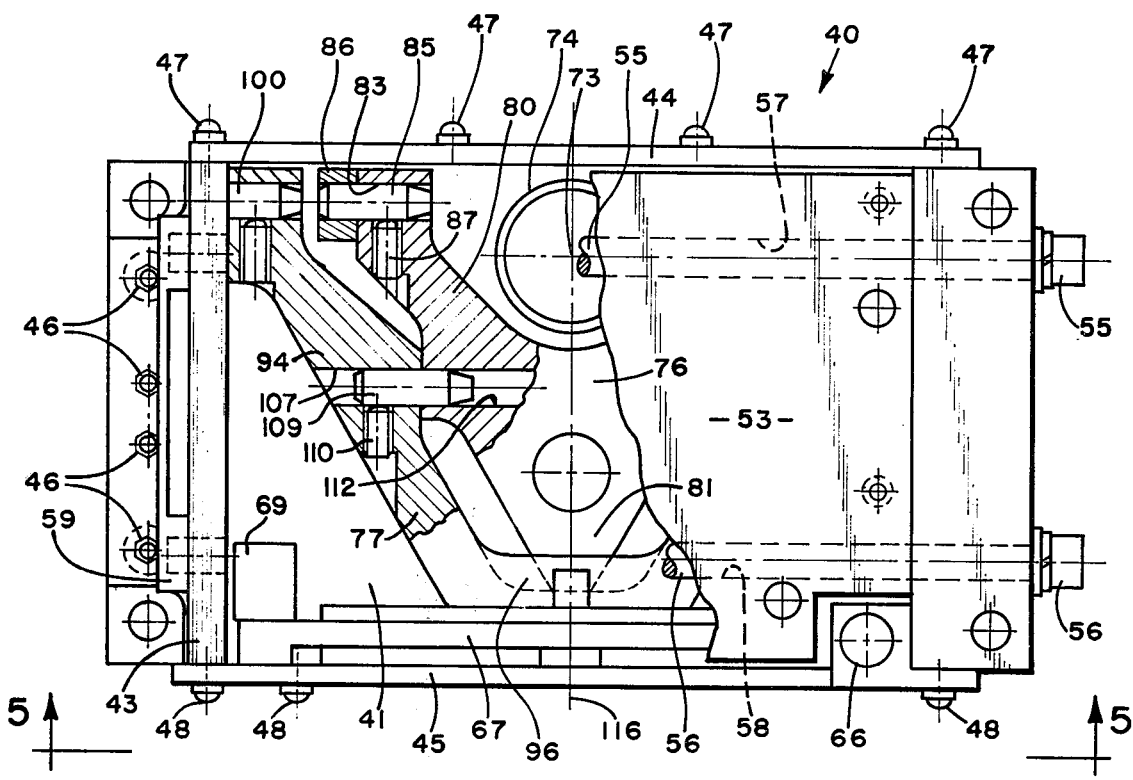
FIG. 4 is a plan view of the translation mechanism embodying this invention with portions broken away and shown partially in section.
Figure 5:
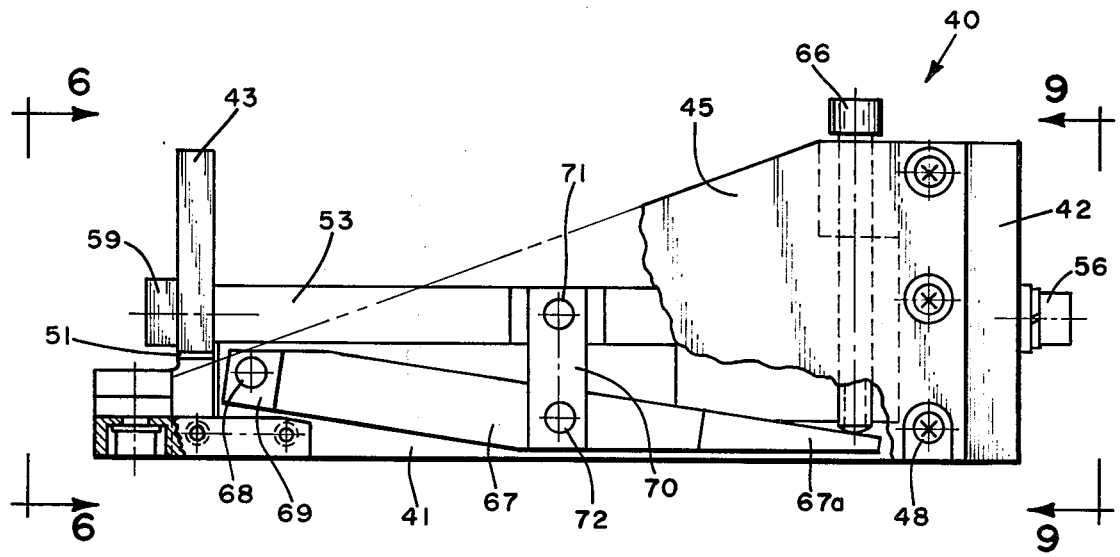
FIG. 5 is a side elevation of the translation mechanism as viewed along line 5—5 of FIG. 4.
Figure 6:
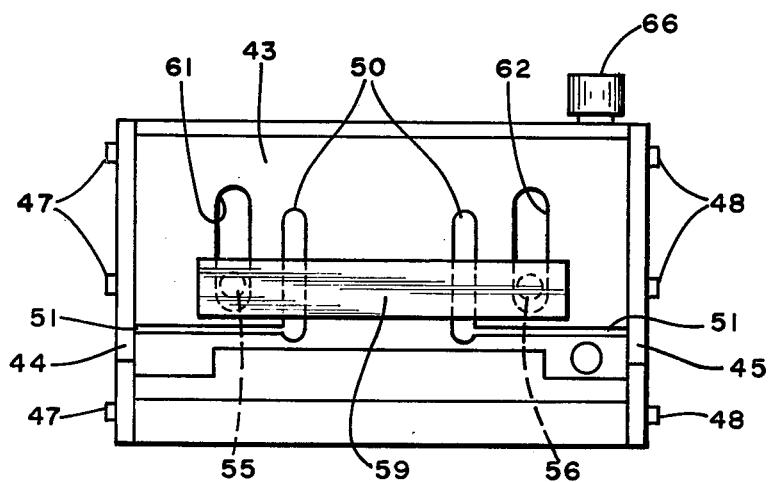
FIG. 6 is an end view of the translating mechanism taken along line 6—6 of FIG. 5.

In this preferred embodiment of the invention, in order to raise and lower the platform relative to the base plate, adjustment means comprising screw 66 and lever 67, see FIGS. 4 and 5, are employed as an alternate to the screw 17 shown in FIGS. 1 and 2. Lever 67 is pivotedly connected by pin 68 to boss 69 formed integrally on base plate 41. The central portion of lever 67 is connected by link 70 to the central part of the side edge of platform 53 by pin 71. Link 70 is connected to lever 67 by a pin 72 directly below pin 71, as viewed.

The end 67a of lever 67 opposite the pivoted end is vertically aligned with screw 66 which adjusts the elevation of the platform by pivoting lever 67 about its pivotal connection to boss 69. The axis of pin 71 preferably is in the mechanism center plane 116, see FIG. 4, which extends parallel to end walls 42 and 43 and which also contains the vertical axis 73 of biasing spring 74. This arrangment provides a balanced application of forces to the platform which further tends to stabilize the system.

Figure 7:
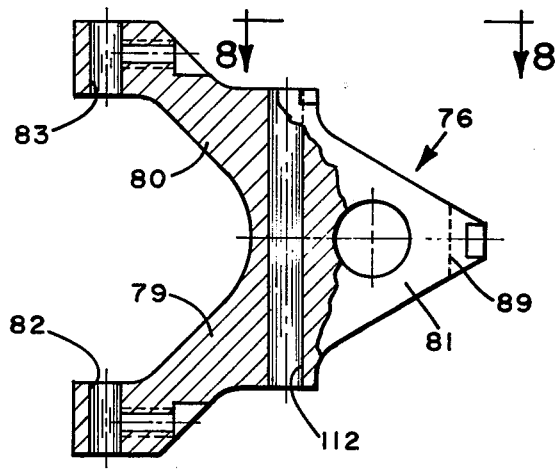
FIG. 7 is a plan view, partially in section, of the small support arm.
Figure 8:
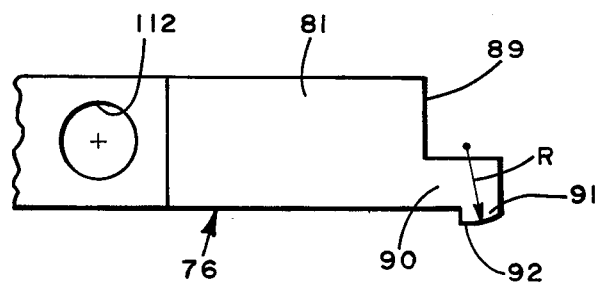
FIG. 8 is an enlarged elevation of part of the small support arm as viewed along line 8—8 of FIG. 7.
Figure 9:
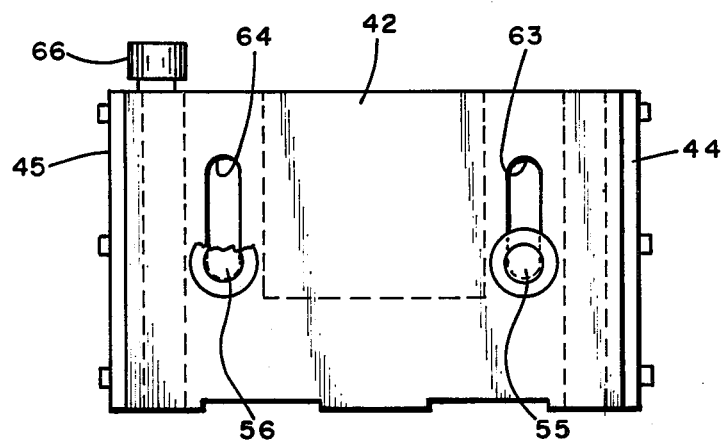
FIG. 9 is a view of the other end of the translating mechanism taken on line 9—9 of FIG. 5.
Figure 10:
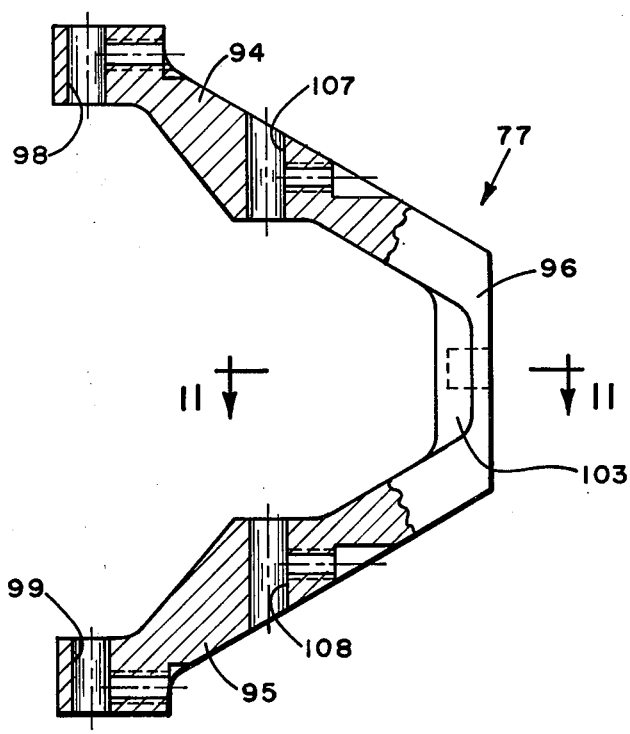
FIG. 10 is a view similar to FIG. 7 showing the larger support arm.
Figure 11:
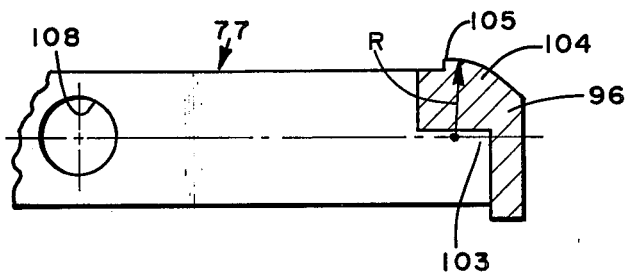
FIG. 11 is an enlarged transverse section taken on line 11—11 of FIG. 10.

Platform 53 is guided in movement relative to the base plate by a U-shaped inner arm 76, see FIGS. 4, 7 and 8, and by outer arm 77, see FIGS. 10 and 11. Inner arm 76 comprises leg portions 79 and 80 spaced apart at one end and connected at the opposite end by a cross portion 81. Leg portions 79 and 80 have bores 82 and 83, respectively, with coincident axes for pivotally connecting the inner arm by pins to bosses on the underside of platform 53, one of such pins 85 and one of such bosses 86 being shown in FIG. 4. Pin 85 is secured within bore 83 by a set screw 87.

Cross portion 81 of inner arm 76 comprises a triangularly shaped piece, see FIG. 7, having a transverse recess 89 with perpendicular sides defining a projecting portion 90, see FIG. 8. Recess 89 is formed on the surface of connecting portion 81 which faces platform 53 and the opposite side of projecting portion 90 is formed with a step 91 having a cylindrical surface 92 with a radius R and which is adapted to engage base plate 41. Radius R is equal to the spacing of the pivot axis of the inner arm from the platform as described above in connection with FIG. 3.

Outer arm 77, see FIGS. 4 and 10, is shaped similarly to the inner arm and has leg portions 94 and 95 and a cross portion 96. The spaced ends of leg portions 94 and 95 have bores 98 and 99, respectively, with coincident axes for pivotedly connecting the outer arm by pins to the end walls, one of said pins 100 being shown in FIG. 4 for connection to end wall 43.

Cross portion 96 of outer arm 77 has a transverse recess 103 with perpendicular side walls and which is complementary to recess 89 of the cross portion of inner arm 76. The upper end of the cross portion 96 has a step 104 with a cylindrical surface 105 having a radius R equal to the spacing of the pivot axis of the outer arm from the base plate as well as to the radius of formation of surface 92 on inner arm 76 as described above.

The mid-parts of leg portions 94 and 95 of outer arm 77 have bores 107 and 108, respectively, see FIG. 10, for receiving pivot pins which pivotally connect the inner and outer arms together; one of the pins 109 is shown in FIG. 4. These pivot pins are secured to the outer arm by set screws 110 and project inwardly into bore 112 in the inner arm, see FIG. 7.

The space between the leg portions of the outer arm is greater than the outside width dimension of the inner arm so that the latter is nestable within the outer arm when the platform is moved to its lower limit of movement. In this position, recesses 89 and 103 of the respective cross portions of the arms engage each other in the manner generally indicated for arms 19 and 20 in FIG. 2, the curved surfaces 92 and 105 being in vertical alignment with each other so as to engage the base plate and platform, respectively, at points of contact which are vertically aligned.

Spring 74, see FIG. 4, is located between base plate 41 and platform 53 with its axis 73, preferably on the center plane 116 of the assembly between end walls 42 and 43 located near side wall 44. The spacing between and length of leg portions 79 and 80 of inner arm 76 are sufficient to provide a clearance with spring 74 at all elevations of the platform. Similarly leg portions 94 and 95 of outer arm 77 are spaced sufficiently to permit inner arm 76 to pivot freely within the outer leg without interference. Both arms have the same overall thickness and nest together when the platform is moved to the lower limit so that the spacing between the platform and base plate at that limit so that the spacing between the platform and base plate at that limit is approximately the thickness of arms 76 and 77.

What is claimed is:

1. Translating mechanism comprising
   a plane base plate,
   a platform disposed parallel to said plate and movable relative thereto in a first direction perpendicular to the plane of the plate,
   spring means between and engaging said platform and said plate for urging the platform and plate apart,
   adjustment means operably engageable with said platform and said plate for adjusting the spacing therebetween,
   first and second U-shaped arms disposed between said plate and said platform and pivotally connected together along a first axis midway between said plate and said platform,
   said first arm having one end pivotally connected along a second axis to and at a spacing R from said plate and having the other end thereof slideably engageable with said platform,
   said second arm having one end pivotally connected along a third axis to and at a spacing R from platform and having the other end thereof slideably engageable with said plate,
   said first, second and third axes being parallel to said plate,
   the parts of said other ends of said first and second arms engageable with said platform and plate, respectively, comprising arcuately shaped surfaces with radii of curvature, respectively, equal to R.

2. Mechanism according to claim 1 in which said arms are symmetrically disposed about a plane extending perpendicular to said pivotal axes, said other ends of said arms engaging said plate and said platform, respectively, being symmetrically disposed about said plane of symmetry.

3. Mechanism according to claim 2 in which said spring means comprises a helical spring having an axis in said plane of symmetry and extending parallel to said first direction.

4. Translating mechanism comprising
   a plane base plate,
   a platform disposed parallel to said plate and movable relative thereto in a first direction perpendicular to the plane of the plate,
   spring means between said engaging said platform and said plate for urging the platform and plate apart,
   adjustment means operably engageable with said platform and said plate for adjusting the spacing therebetween,
   first and second U-shaped arms disposed between said plate and said platform and pivotally connected together along a first axis,
   said first arm having one end pivotally connected along a second axis to and at a spacing R from said plate and having the other end thereof slideably engageable with said platform,
   said second arm having one end pivotally connected along a third axis to and at a spacing R from platform and having the other end thereof slideably engageable with said plate,
   said first, second and third axes being parallel to said plate,
   said first arm having first and second leg portions and a cross portion interconnecting said leg portions, said second arm having a smaller width than said first arm whereby said second arm is nestable within said first arm at the limit of movement of said platform toward said plate,
   the parts of said other ends of said first and second arms engageable with said platform and plate, respectively, comprising arcuately shaped surfaces with radii of curvature, respectively, equal to R.

5. Mechanism according to claim 4 in which said surfaces are formed on said cross portions, respectively, said cross portion of said first arm having a recess for receiving adjacent parts of the cross portion of said second arm.

6. Mechanism according to claim 5 in which said surfaces on the respective cross portions are aligned in said first direction.

7. Mechanism according to claim 4 in which said end plates have longitudinally aligned guide slots extending in said first direction, said last named means comprising screw means extending through said platform and through said slots in the end plates, and a nut threadedly engageable with said screw means on the exterior of one of said end plates.

8. Mechanism according to claim 7 in which at least one of said end plates has a flexing slot formed therein transversely of said first direction and located closer to said base plate than said guide slot whereby to enhance flexibility of one of said end plates for clamping said platform.

9. Translating mechanism comprising
   a plane base plate,
   a platform disposed parallel to said plate and moveable relative thereto in a first direction perpendicular to the plane of the plate,
   spring means between said engaging said platform and said plate for urging the platform and plate apart,
   adjustment means operably engageable with said platform and said plate for adjusting the spacing therebetween,
   first and second arms disposed between said plate and said platform and pivotally connected together along a first axis,
   said first arm having one end pivotally connected along a second axis to said plate and having the other end thereof slideably engageable with said platform,
   said second arm having one end pivotally connected along a third axis to said platform and having the other end thereof slideably engageable with said plate,
   said first, second and third axes being parallel to said plate,
   first and second end walls connected to and projecting perpendicularly from said base plate in said first direction,
   the spacing between said walls being slightly greater than the corresponding dimension of said platform to permit movement of said platform in said first direction, and means for drawing at least one of said end walls toward the other and against said platform to clamp the latter.

10. Mechanism according to claim 9 in which said end walls have longitudinally aligned guide slots extending in said first direction, said last named means comprising screw means extending through said platform and through said slots in the end walls, and a nut threadedly engageable with said screw means on the exterior of one of said end walls.

11. Translating mechanism comprising a plane base plate, a platform disposed parallel to said plate and movable relative thereto in a first direction perpendicular to the plane of the plate, spring means between and engaging said platform and said plate for urging the platform and plate apart, adjustment means operably engageable with said platform and said plates for adjusting the spacing therebetween, first and second arms disposed between said plate and said platform and pivotally connected together along a first axis, said first arm having one end pivotally connected along a second axis to and at a spacing R from said plate and having the other end thereof slideably engageable with said platform, said second arm having one end pivotally connected along a third axis to and at a spacing R from platform and having the other end thereof slideably engageable with said plate, said first, second and third axes being parallel to said plate, the parts of said other ends of said first and seccond arms engageable with said platform and plate, respectively, comprising arcuately shaped surfaces with radii of curvature, respectively, equal to R, first and second end plates connected to and projecting perpendicularly from said base plate, the spacing between said plates being slightly greater than the corresponding dimensions of said platform to permit movement of said platform in said first direction, and means for drawing at least one of said end plates toward the other and against said platform to clamp the latter.

* * * * *